(12) United States Patent
Tuttle et al.

(10) Patent No.: US 7,194,673 B2
(45) Date of Patent: Mar. 20, 2007

(54) DETECTING INTERMITTENT LOSSES OF SYNCHRONIZATION IN A FIBRE CHANNEL LOOP

(75) Inventors: James M. Tuttle, Lunenburg, MA (US); Douglas E. Peeke, Shrewsbury, MA (US); Geoffrey Reid, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 409 days.

(21) Appl. No.: 10/327,338

(22) Filed: Dec. 20, 2002

(65) Prior Publication Data

US 2004/0153685 A1    Aug. 5, 2004

(51) Int. Cl.
*H03M 13/33* (2006.01)
*H03M 13/01* (2006.01)

(52) U.S. Cl. ..................... 714/775; 714/700
(58) Field of Classification Search .............. 714/775, 714/752, 746, 12, 55, 707, 700; 713/400, 713/500; 375/354
See application file for complete search history.

(56) References Cited

U.S. PATENT DOCUMENTS

| | | | | |
|---|---|---|---|---|
| 4,229,815 A | * | 10/1980 | Cummiskey | ............... 370/358 |
| 4,698,808 A | * | 10/1987 | Ishii | ........................... 714/722 |
| 5,590,122 A | * | 12/1996 | Sandorfi et al. | ............ 370/394 |
| 5,603,056 A | | 2/1997 | Totani | |
| 5,613,100 A | * | 3/1997 | Anezaki | ...................... 710/65 |
| 5,649,123 A | * | 7/1997 | Kowert | ........................ 710/109 |
| 5,673,132 A | | 9/1997 | Carbone, Jr. et al. | |
| 5,841,997 A | | 11/1998 | Bleiweiss et al. | |
| 5,890,214 A | | 3/1999 | Espy et al. | |
| 5,901,151 A | | 5/1999 | Bleiweiss et al. | |
| 6,317,800 B1 | | 11/2001 | Westby et al. | |
| 6,373,310 B1 | * | 4/2002 | Jacobs | ........................ 327/217 |
| 6,421,711 B1 | | 7/2002 | Blumenau et al. | |
| 6,425,049 B1 | | 7/2002 | Yamamoto et al. | |
| 6,430,714 B1 | | 8/2002 | McAdam et al. | |
| 6,473,301 B1 | | 10/2002 | Levy et al. | |
| 2002/0044562 A1 | | 4/2002 | Killen, Jr. et al. | |
| 2002/0046276 A1 | | 4/2002 | Coffey et al. | |
| 2003/0221140 A1 | * | 11/2003 | Bakke et al. | .................. 714/25 |

* cited by examiner

*Primary Examiner*—Albert Decady
*Assistant Examiner*—Dipakkumar Gandhi
(74) *Attorney, Agent, or Firm*—Guerin & Rodriguez, LLP; Michael A. Rodriguez

(57) ABSTRACT

Described are a storage system and method for detecting an intermittent loss of synchronization in communication signals received by an enclosure connected to a Fibre Channel loop. A control board produces a first signal representing a status of communication signals received by the control board. The first signal is in one of a plurality of logical states. A first logical state indicates that the status of the communication signals is invalid and a second logical state indicates that the status of the communication signals is valid. The control board includes a glitch-detection circuit that places a second signal in an asserted logical state when the first signal is in the first logical state during a time interval and holds the second signal at the asserted logical state when the first signal transitions from being in the first logical state to being in the second logical state during the time interval.

20 Claims, 3 Drawing Sheets

DETECTING INTERMITTENT LOSSES OF SYNCHRONIZATION IN A FIBRE CHANNEL LOOP

FIELD OF THE INVENTION

The invention relates generally to data storage systems that can be used in computer systems and computer networks. More particularly, the invention relates to detecting intermittent losses of synchronization in a data storage system.

BACKGROUND

Referring to FIG. 1, a typical data storage system 10 includes at least one rack 12 of storage devices or enclosures 14, 14' (generally, enclosure 14) having a plurality of disk modules 18. The data storage system 10 can have fewer or more enclosures than those shown (internal or external to the rack 12). Examples of enclosures include disk-array enclosures (DAE) and disk-array processor enclosures (DPE). A typical DAE includes a plurality of disk modules 18 (e.g., fifteen), one or two link control cards (LCCs), and one or two power supplies. A typical DPE includes a plurality of disk modules 18 (e.g., fifteen), one or two storage processors, one or two LCCs, and one or two power supplies. Each disk module 18 includes a carrier assembly that holds a disk drive and slides into the enclosure 14.

The enclosures 14, 14' implement redundancy with an "A" side and a "B" side. In enclosure 14, for example, each side has a link control card (LCC) 22, 22' and a power supply (not shown). Reference numerals for the B side components are the same as corresponding components on the A side with the addition of a prime (') designation. Each LCC 22, 22' includes a primary communications port 26, 26' and an expansion communications port 30, 30'. The enclosures 14, 14' are connected to each other by cables 34, 34' in a loop topology. Communication signals traverse the loop in one direction and pass from enclosure 14 to enclosure 14', in a daisy-chain fashion, and then return from enclosure 14' to enclosure 14. An enclosure receiving communication signals targeted for a different enclosure forwards those signals along the loop.

A common implementation of the loop is a Fibre Channel arbitrated loop. Fibre Channel is a computer communications protocol for communicating signals. In general, the Fibre Channel protocol provides an interface by which host processors 20, 20' (and servers) communicate with the enclosures 14 and with the disk modules 18 installed within the enclosures 14.

Each LCC 22 of the data storage system 10 typically has port bypass circuitry (PBC) 38 for detecting the presence of valid Fibre Channel encoded serial data on the loop and for asserting a "signal detect" signal when such valid data are detected. When the PBC 38 does not detect valid encoded data, the LCC 22 de-asserts the signal-detect signal. The de-asserted signal-detect signal is, in effect, an asserted "loss-of-sync" signal, which is indicative of failed equipment on the loop, such as a broken or disconnected cable.

To detect failures on the loop, a processor 42 of the LCC 22 executes software that periodically polls the status of the signal-detect signal (or, conversely, the status of the loss-of-sync signal). In general, the frequency of polling is effective to detect hard equipment failures. However, some failures are intermittent, and an asserted loss-of-sync signal can become de-asserted before the next polling occurrence. Thus, the data storage system 10 appears to the processor 42 to be operating properly although it is providing undetected early indications of a failure. Therefore, there remains a need for a system and method that can detect intermittent loop failures and, consequently, early indications of a storage system malfunction.

SUMMARY

In one aspect, the invention features a method for detecting an occurrence of an intermittent error in a data storage system. A first signal is provided. The first signal represents a status of communication signals received by an enclosure in the data storage system. The first signal is in one of a plurality of logical states. A first one of the logical states indicates that the status of the communication signals is invalid and a second one of the logical states indicates that the status of the communication signals is valid. A second signal is asserted when the first signal is in the first logical state during a time interval. The second signal is held at an asserted state when the first signal transitions from being in the first logical state to being in the second logical state during the time interval.

In another aspect, the invention features a storage enclosure comprising a control board that produces a first signal representing a status of communication signals received by the control board. The first signal is in one of a plurality of logical states. A first one of the logical states indicates that the status of the communication signals is invalid and a second one of the logical states indicates that the status of the communication signals is valid. The control board includes a glitch-detection circuit that places a second signal in an asserted logical state when the first signal is in the first logical state during a time interval and holds the second signal at the asserted logical state when the first signal transitions from being in the first logical state to being in the second logical state during the time interval.

In another aspect, the invention features a control board for-use in a storage enclosure. The control board comprises means for providing a first signal representing a status of communication signals received by an enclosure in the data storage system. The first signal is in one of a plurality of logical states. A first one of the logical states indicates that the status of the communication signals is invalid and a second one of the logical states indicates that the status of the communication signals is valid. The control board also includes means for asserting a second signal when the first signal is in the first logical state during a time interval, and means for holding the second signal at an asserted state when the first signal transitions from being in the first logical state to being in the second logical state during the time interval.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, data storage systems with enclosures connected to a Fibre Channel (FC) arbitrated loop can use the present invention to detect early failures in the FC loop. The present invention features circuitry and software that captures (i.e., detects and records) the occurrence of errors on the FC loop that appear and disappear entirely within a polling interval (i.e., after a first status check and before a subsequent status check). Such errors are hereafter also referred to as glitches or intermittent failures. Without the present invention, such errors remain undetected. Although the invention is illustrated through the use of FC link control cards, it is to be understood that the principles of the invention apply to any type of enclosure card or board that performs a logic or control function and communicates with the other boards or processors, such as an Advanced Technology Attachment (ATA) bridge control card.

Figure 1:
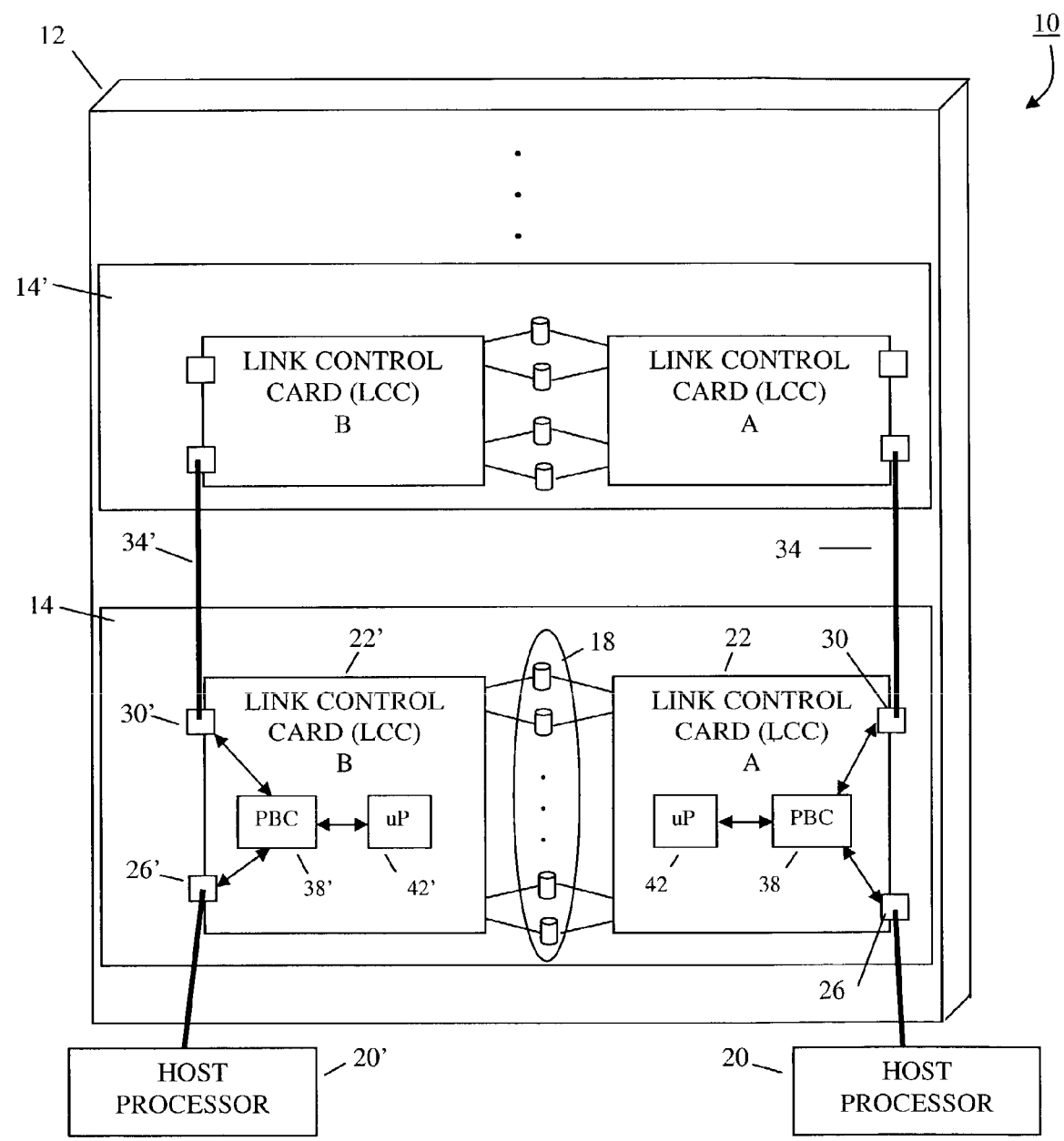
FIG. 1 is a functional block diagram of an example of a data storage system including a plurality of enclosures connected in a Fibre Channel (FC) arbitrated loop.
Figure 2:
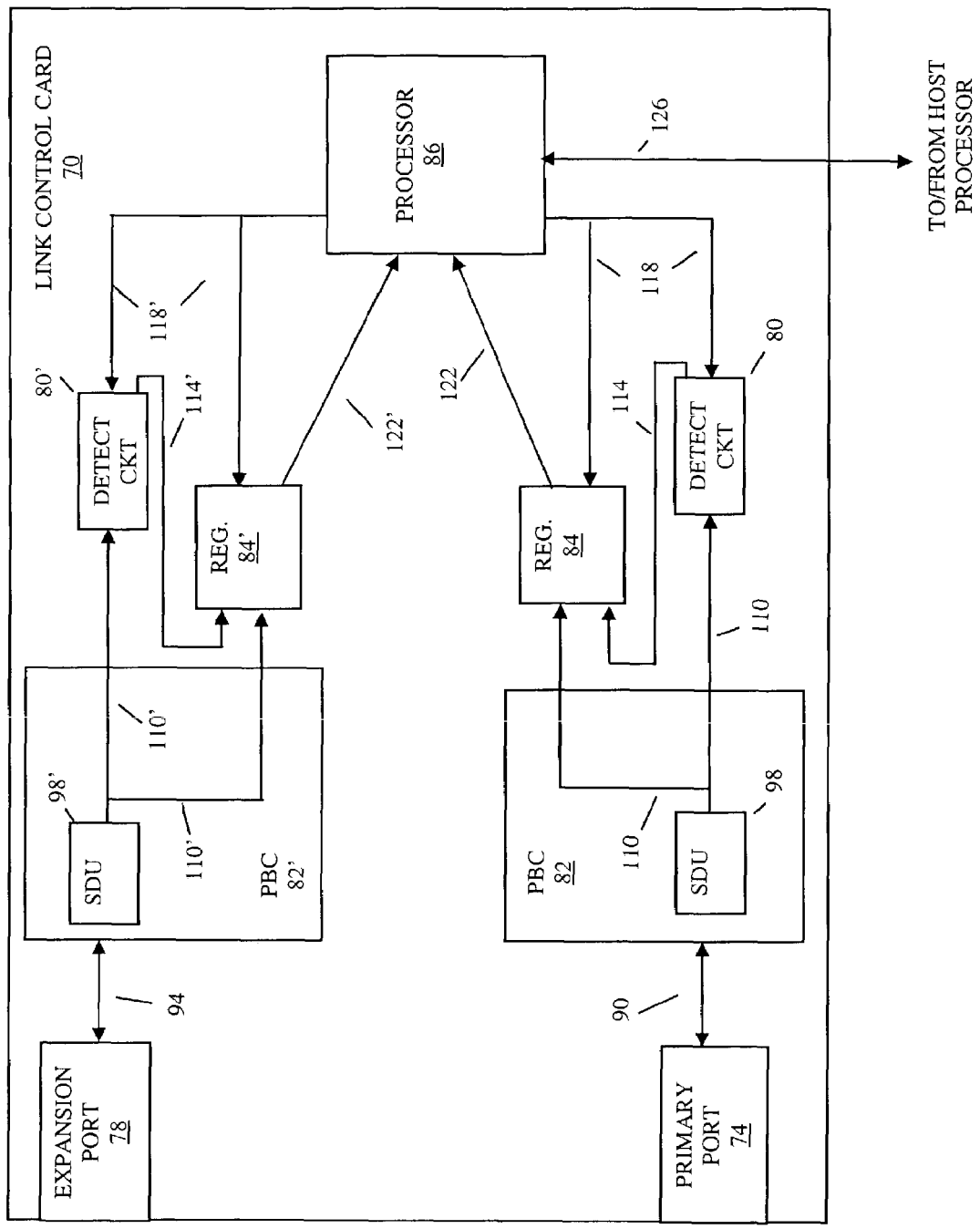
FIG. 2 is a functional block diagram of an example of a link control card constructed in accordance with the principles of the invention, the link control card including glitch-detection circuitry for detecting and holding an intermittent error for a subsequent polling event.

FIG. 2 shows an embodiment of a link control card 70 constructed in accordance with the principles of the invention for use within an enclosure of a data storage system. The LCC 70 includes a primary port 74, an expansion port 78, glitch-detection circuits 80, 80' (generally, glitch-detection circuit 80), port bypass circuits 82 and 82' (generally, PBC 82), registers 84, 84' (generally, register 84), and a processor 86. Signal lines 90 connect the primary port 74 to the port bypass circuit 82, and signal lines 94 connect the expansion port 78 to the port bypass circuit 82'. The primary and expansion ports 74, 78 provide hardware pathways by which FC communication signals pass into and out of the link control card 70.

Each glitch-detection circuit 80, 80' includes an input terminal for receiving a signal-detect (or loss-of-sync) signal on respective loss-of sync (LOS) signal lines 110, 110' (generally, LOS signal lines 110), and an output terminal for providing a "glitch detected" signal on respective loss-of-sync (LOS) latched signal lines 114, 114' (generally, LOS latched signal lines 114). The processor 86 is in electrical communication with the glitch-detection circuits 80, 80' by the polling-signal lines 118, 118' (generally, polling-signal lines 118), respectively. In an alternate embodiment, the LCC 70 has only one glitch-detection circuit (80 or 80').

Each PBC 82, 82' includes a signal detect unit (SDU) 98, 98' (generally, SDU 98), respectively. In one embodiment, each PBC 82, 82' is implemented by a six port bypass circuit chip (e.g., an integrated circuit no. VSC7147, manufactured by Vitesse Semiconductor Corporation of Camarillo, Calif.). In an alternate embodiment, each of the PBCs 82, 82' includes one of the glitch-detection circuits 80, 80' (i.e., the glitch-detection circuit 80 is part of the PBC 82), one of the registers 84, 84', or both a glitch-detection circuit 80 and a register 84.

Each SDU 98 is in electrical communication with the glitch-detection circuit 80 and register 84 by the LOS signal lines 110, and each glitch-detection circuit 80 is in electrical communication with the register 84 by the LOS latched signal lines 114. The register 84 holds the states (i.e., logic high or logic low) of the LOS signal line 110 and of the LOS latched signal line 114 for the processor 86 to read; the register 84' holds the states of the LOS signal line 110' and of the LOS latched signal line 114'. The registers 84, 84' can hold other types of status information, such as the states of signals representing the status of power supplies and of fans in the enclosure.

The processor 86 is in electrical communication with the registers 84, 84' by the polling-signal lines 118, 118', respectively, to read the contents of the registers 84, 84' and by status signal lines 122, 122' (generally, status signal lines 122), respectively, to obtain the various signal states in response to a poll, including the states of the LOS and LOS latched signals 110, 114. In an alternate embodiment, each SDU 98 is not in electrical communication with the respective register 84, that is, there are no signal line connections 110, 110' between the SDU 98, 98' and the respective register 84, 84'.

The operation of the LCC 70 is now described using the PBC 82 of FIG. 2 to illustrate the principles of the invention. During operation, the SDU 98 monitors the FC signals arriving from and going to the primary port 74 to determine if the signals are valid or if there has been a loss of synchronization. Methods for detecting a loss of synchronization in FC signals are based on several criteria and are known in the art. When the FC signals are valid, the SDU 98 provides a logic high state on the LOS signal line 110 (i.e., corresponding to a signal-detect signal). If the SDU 98 detects a loss of synchronization in the FC signals, a logic low state appears on the LOS signal line 110 (corresponding to a LOS signal). In an alternate embodiment, the signal-detect signal is a logic low state and the LOS signal is a logic high state.

The signal-detect signal (or LOS signal) passes to the glitch-detection circuit 80 and the register 84. The glitch-detect circuit 80 monitors the LOS signal line 110 for a glitch, i.e., a momentary assertion (here, a low-going signal transition) and de-assertion (here, a high-going transition) of the LOS signal. A logic low state on LOS latched signal line 114 indicates that the glitch-detection circuit 80 detected a glitch on the LOS signal line 110. A logic high state on the LOS latched signal line 114 indicates no glitch was detected. The glitch-detection circuit 80 can also detect "hard" failures (i.e., the LOS signal line 110 enters a logic low state and remains in the low state). For hard failures, a logic low state also appears on the LOS latched signal line 114. The operation of the corresponding components of PBC 82' is substantially similar to that of the PBC 82, with a difference being that the SDU 98' of the PBC 82' monitors the FC signals arriving from and passing to the expansion port 78.

The processor 86 periodically reads or polls the registers 84, 84' at regular time intervals to obtain the status of the LOS signal lines 110 and 110' and of the LOS glitch-detection signal lines 114 and 114'. Each register 84 receives a polling signal on the respective polling-signal line 118, 118'. The glitch-detection circuits 80, 80' also receive the polling signal on the respective polling-signal line 118, 118'. In one embodiment, the time interval between successive polls is on the scale of hundreds of milliseconds.

In response to the polling signal, the registers 84, 84' provide status information to the processor over the status signal lines 122. From this status information, the processor 86 determines if there currently exists a loss of synchronization in the FC loop and whether a loss-of-synchronization glitch occurred on either or both LOS signal lines 110 and 110' since the previous polling occurrence. Also in response to the polling signal from the processor 86, the glitch-detection circuits 80 become "cleared" or "reset" to become ready for capturing a glitch on the LOS signal lines 110 during the next polling interval (i.e., the period between successive polls).

A host processor (not shown) periodically polls the processor 86 to obtain the results of the polling performed by the processor 86. Although shown in FIG. 2 to be logically connected to the processor 86 by signal line 126, the host processor communicates with the processor 86 through the primary port 74. In one embodiment, this communication follows the RS-232 protocol. The communication path between the host processor and the LCC 70 using the RS-232 protocol over a FC loop is described in U.S. Pat. No. 5,901,151, issued to Bleiweiss et al. on May 4, 1999, the entirety of which patent is incorporated by reference herein.

In general, the time interval between successive polls by the host processor is longer than the polling interval of the processor 86. In one embodiment, the time interval between successive polls by the host processor is on the scale of seconds (e.g., 3s). Consequently, the processor 86 polls the registers 84, 84' multiple times during a single host processor polling interval.

The type and amount of status information returned by the processor 86 to the host processor in response to the host processor poll can vary, depending upon the design of the software run by the processor 86. The returned status information can be minimal or extensive. For example, in one embodiment the processor 86 sets a flag when it determines (by polling the register 84, 84') that the LOS signal is asserted or that a glitch is detected, and, in response to a poll from the host processor, reports to the host processor whether that flag is set. In another embodiment, the processor 86 executes software that summarizes or tabulates the polling results obtained from the registers 84, 84' since the last host processor poll, to streamline the amount of data that is sent to the host processor. For example, the status information sent by the processor 86 to the host processor can include whether a LOS signal, a glitch (LOS latched signal), or both was detected since the previous host processor poll, and the identity of the PBC 82, glitch-detection circuit 80, or both that detected the error. The status information can further include the number of asserted LOS signals, latched glitches, or both that occurred since the last host processor polling event.

Figure 3:
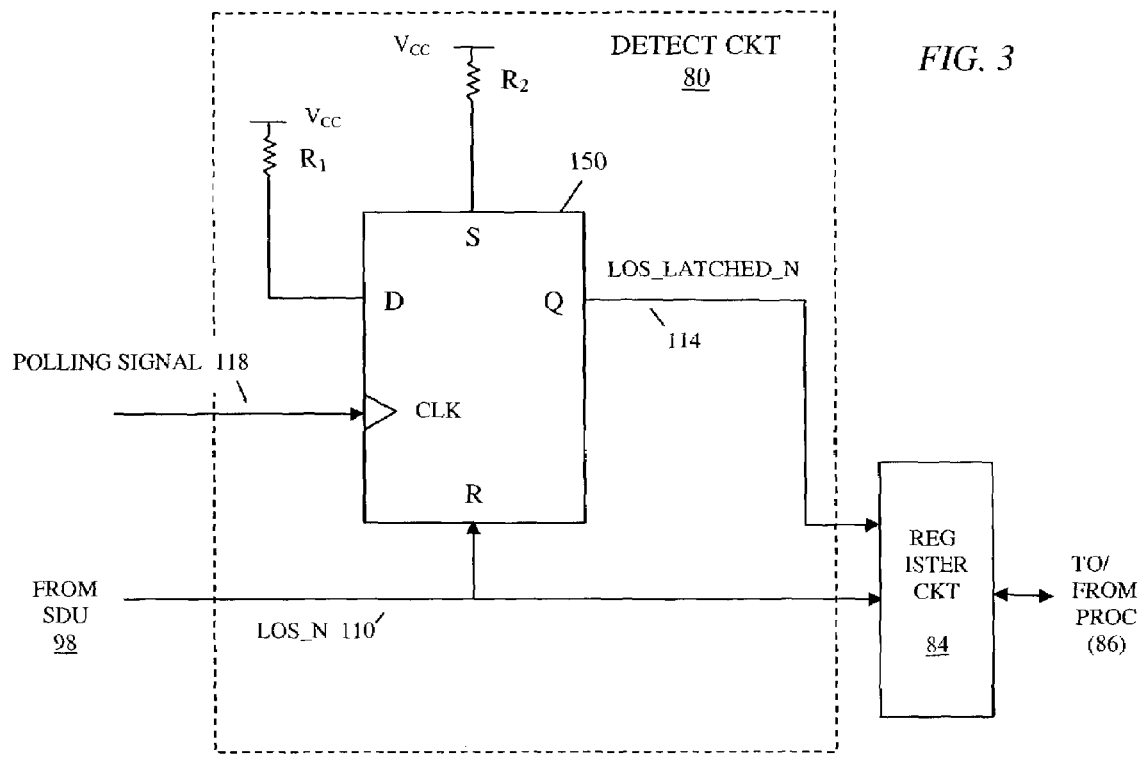
FIG. 3 is a functional block diagram of an embodiment of the glitch-detection circuitry of the present invention.

FIG. 3 shows a logic diagram of an embodiment of the glitch-detection circuit 80 of FIG. 2 (representative also of the glitch-detection circuit 80'). In accordance with the principles of the invention, the glitch-detection circuit 80 is useful for detecting a glitch on the LOS signal line 110 (FIG. 2) and for latching the glitch so that it can be detected during the next poll of the register 84 by the processor 86 (FIG. 2). The glitch-detection circuit 80 comprises a D-type flip-flop 150 with clock (CLK), data (D), set (S) and reset (R) input terminals, and an output terminal (Q). An example of a device for implementing the D-type flip-flop 150 is the integrated circuit device no. 74AHCT74_A, manufactured by Philips Semiconductor of The Netherlands.

The data (D) and set (S) input terminals are each connected to a voltage supply ($V_{CC}$) through pull-up resistors $R_1$ and $R_2$, respectively. The clock (CLK) input terminal is connected to the polling-signal line 118 to receive the polling signal from the processor 86 (FIG. 2). The reset (R) input terminal is connected to the LOS signal line 110 to receive the LOS signal (LOS_N) from the SDU 98. In general, the "_N" portion of a signal name indicates that the signal is asserted when in a low state and de-asserted when in a high state. The output terminal (Q) is connected to the LOS latched signal line 114 for sending an LOS latched signal (LOS_LATCHED_N) to the register 84.

In brief overview, during the operation of the D-type flip-flop 150, a high-to-low signal transition on the reset (R) input terminal produces a logic low state on the output terminal (Q). Thus, a logic low state appears on the reset (R) input terminal when the SDU 98 detects a loss of synchronization (i.e., the signal on the LOS signal line 110 transitions from a logic high state to a logic low state). The logic low state on the reset (R) input terminal causes a logic low state to appear on the output terminal (Q). Thus, when the SDU 98 detects a loss of synchronization, the LOS_LATCHED_N signal is asserted. Further, this logic low output passes to the register 84, from which the processor 86 obtains the status information upon the next polling signal.

A polling signal from the processor 86 operates to "clear" the D-type flip-flop 150 as follows. The state on the data (D) input terminal transfers to the output terminal (Q) upon a logic low to a logic high signal transition of the polling signal on the clock (CLK) input terminal. Accordingly, when the D-type flip-flop 150 receives a polling signal from the processor 86, the state of the D input terminal, which is pulled to a logic high level, transfers to the output terminal (Q). When the polling signal returns to a logic low state, the high state of the D input remains on the output terminal (Q). Any low state latched on the Q output terminal due to the detection of a loss of synchronization thus becomes set to a high state. The D-type flip-flop 150 is now able to detect another glitch on the LOS signal line 110 during the next polling interval (i.e., before the processor 86 polls again).

Figure 4:
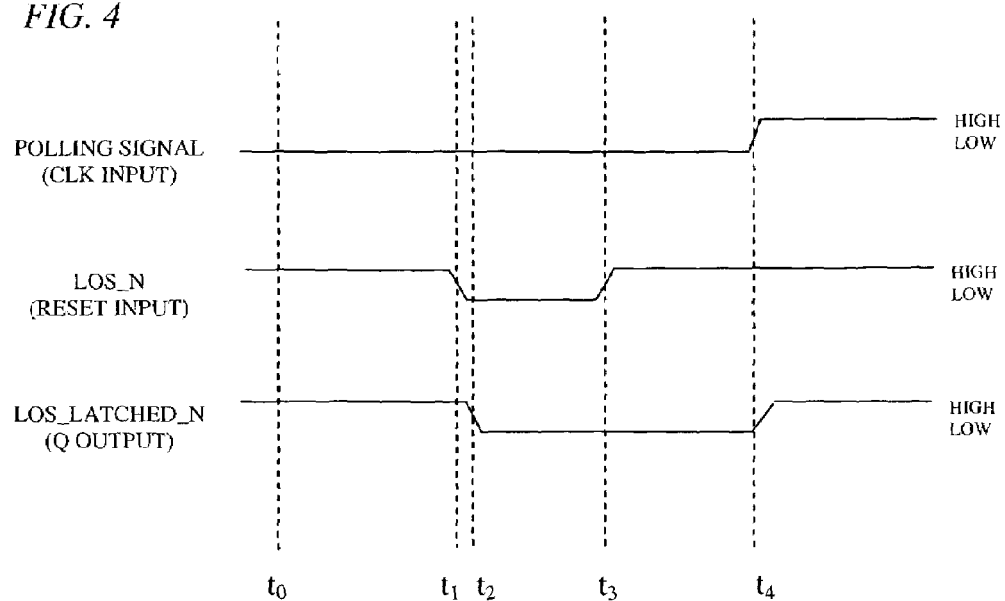
FIG. 4 is a timing diagram illustrating the states of various signals during operation of the glitch-detection circuitry.

Operation of the glitch-detection circuit 80 is now described with reference to FIG. 3 and FIG. 4. At time $t_0$, the polling signal on the clock input terminal (CLK) is at a logic low state and the LOS_N signal on the reset input terminal (R) is in a logic high state. The output (Q) is also in a high state, indicating that no loss of synchronization glitch or failure has been detected or latched. At time $t_1$, the LOS_N signal transitions from a logic high state to a logic low state, indicating that the SDU 98 has detected a loss of synchronization in the FC signals. This signal transition on the reset (R) input terminal causes the output at the output terminal (Q) to transition to a low state. This occurs at time $t_2$. At time $t_3$, the LOS_N signal on the reset (R) input terminal returns to a logic high state. Also at time $t_3$, the polling signal at the clock input terminal (CLK) is in a low state. Accordingly, the high-to-low-to-high signal transitions of the LOS_N signal occur within a single polling interval and are thus indicative of an intermittent failure occurring on the FC loop. Also, the transition to a high state by the LOS_N signal has no effect on the state of the output (LOS_LATCHED_N) at the output terminal (Q), which remains in a logic low state.

Without the glitch-detection circuit 80 of the invention, this glitch of the LOS signal is missed because the entire signal transition from high to low and then back to high occurs within a single polling interval. Consequently, if the LOS_N signal remained in the high state, the next polling signal from the processor 86 would read a high state from the register 84, and thus not see a failure. With the glitch-detection circuit 80 of the invention, the intermittent failure is recorded by the LOS latched signal (LOS_LATCHED_N), which remains at a logic low state at time $t_3$ although the LOS_N signal is no longer in a low state. Then when the processor 86 polls the register 84, a logic low state is present, corresponding to the LOS_LATCHED_N signal on the LOS latched signal line 114, although a logic high state appears for the LOS_N signal on the LOS signal line 110.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for detecting an occurrence of an intermittent error in a data storage system, the method comprising:
   providing a first signal representing a status of communication signals received by an enclosure in the data storage system, the first signal being in one of a plurality of logical states, a first one of the logical states indicating that the status of the communication signals is invalid and a second one of the logical states indicating that the status of the communication signals is valid, a transition of the first signal from the first logical state to the second logical state within a polling interval being indicative of an intermittent error in the communication signals;
   asserting a second signal if the first signal is in the first logical state during the polling interval;
   holding the second signal at an asserted state if the first signal transitions from being in the first logical state to being in the second logical state during the polling interval; and
   determining at the end of the polling interval whether the second signal is in the asserted state and is thereby indicating that an intermittent error may have occurred in the communication signals.

2. The method of claim 1, further comprising de-asserting the second signal at the end of the polling interval.

3. The method of claim 1, further comprising polling the first signal and the second signal at the end of the polling interval to determine from the first signal whether the first signal is currently in the first logical state and from the second signal whether the first signal was in the first logical state during the polling interval.

4. The method of claim 1, wherein the first signal is a loss of synchronization signal.

5. The method of claim 1, wherein the communication signals include Fibre Channel signals.

6. A storage enclosure comprising:
   a control board producing a first signal representing a status of communication signals received by the control board, the first signal being in one of a plurality of logical states, a first one of the logical states indicating that the status of the communication signals is invalid and a second one of the logical states indicating that the status of the communication signals is valid, a transition of the first signal from the first logical state to the second logical state within a polling interval being indicative of an intermittent error in the communication signals, the control board including:
      a glitch-detection circuit that places a second signal in an asserted logical state if the first signal is in the first logical state during the polling interval and holds the second signal at the asserted logical state if the first signal transitions from being in the first logical state to being in the second logical state during the polling interval;
      a latch circuit holding a logical state of the second signal received from the glitch-detection circuit during the polling interval; and
      a processor in communication with the latch circuit to read the logical state of the second signal at the end of the polling interval to determine whether the second signal is in the asserted state and is thereby indicating that an intermittent error may have occurred in the communication signals.

7. The storage enclosure of claim 6, wherein the latch circuit holds a logical state of the first signal, and the processor is in electrical communication with the latch circuit to read the logical states of the first and second signals from the latch circuit at the end of the polling interval.

8. The storage enclosure of claim 6, wherein the processor is in electrical communication with the latch circuit and with the glitch-detection circuit, the processor sending a poll signal to the latch circuit and glitch-detection circuit to cause the logical state of the second signal to be read from the latch circuit and the second signal, if asserted, to de-assert.

9. The storage enclosure of claim 6, wherein the processor sends a poll signal to the glitch-detection circuit at the end of the polling interval to cause the second signal, if asserted, to de-assert.

10. The storage enclosure of claim 6, wherein the communication signals include Fibre Channel signals.

11. The storage enclosure of claim 6, wherein the first signal is a loss of synchronization signal.

12. The storage enclosure of claim 6, wherein the glitch-detection circuit includes an electronics flip-flop component having a reset input terminal for receiving the first signal produced by the control board, a clock input terminal for receiving a poll signal from the processor at the end of each polling interval, and an output terminal from which the second signal issues and is provided to the latch circuit.

13. The storage enclosure of claim 6, wherein the control board further includes a port bypass circuit having a signal detect unit for monitoring the status of the communication signals and determining the logical state of the first signal based on the status, the signal detect unit being in electrical communication with the latch circuit and with the glitch-detect circuit for issuing the first signal thereto.

14. A control board for use in a storage enclosure, the control board comprising:
   means for providing a first signal representing a status of communication signals received by an enclosure in the data storage system, the first signal being in one of a plurality of logical states, a first one of the logical states indicating that the status of the communication signals is invalid and a second one of the logical states indicating that the status of the communication signals is valid, a transition of the first signal from the first logical state to the second logical state within a polling interval being indicative of an intermittent error in the communication signals;
   means for asserting and holding a second signal in an asserted state if the first signal is in the first logical state and transitions to the second logical state during the polling interval; and
   means for determining a logical state of the second signal at the end of the polling interval to determine if the second signal is in the asserted state and is thereby indicating that an intermittent error may have occurred in the communication signals.

15. The control board of claim 14, further comprising means for de-asserting the second signal at the end of the polling interval.

16. The control board of claim 14, further comprising means for polling the first signal and the second signal at the end of the polling interval to determine from the first signal whether the first signal is currently in the first logical state and from the second signal whether the first signal was in the first logical state during the polling interval.

17. The control board of claim 14, wherein the first signal is a loss of synchronization signal.

18. The control board of claim 14, wherein the communication signals include Fibre Channel signals.

19. The control board of claim 14, wherein the means for asserting and holding the second signal in an asserted state includes an electronics flip-flop component having a reset input terminal for receiving the first signal, a clock input terminal for receiving a poll signal at the end of each polling interval, and an output terminal from which the second signal issues.

20. The control board of claim 14, wherein the means for providing the first signal includes means for monitoring the status of the communication signals and for determining the logical state of the first signal based on the status.

* * * * *